United States Patent
Tirone et al.

(10) Patent No.: US 8,561,854 B2
(45) Date of Patent: Oct. 22, 2013

(54) DISPENSING DEVICE FOR VISCOUS MATERIALS

(75) Inventors: Christopher Vincent Tirone, East Aurora, NY (US); James Faller, Williamsville, NY (US); Gerald A. Rusch, Fond du Lac, WI (US)

(73) Assignee: Rich Products Corporation, Buffalo, NY (US)

( * ) Notice: Subject to any disclaimer, the term of this patent is extended or adjusted under 35 U.S.C. 154(b) by 0 days.

(21) Appl. No.: 11/712,103

(22) Filed: Feb. 28, 2007

(65) Prior Publication Data

US 2007/0215649 A1    Sep. 20, 2007

Related U.S. Application Data

(63) Continuation-in-part of application No. 11/388,592, filed on Mar. 24, 2006.

(60) Provisional application No. 60/704,521, filed on Aug. 1, 2005.

(51) Int. Cl.
*B67D 7/60* (2010.01)

(52) U.S. Cl.
USPC .......................... 222/391; 222/327; 222/182

(58) Field of Classification Search
USPC ........... 222/323, 325–327, 391, 92–107, 470, 222/544, 562, 405, 509, 192, 135, 182; 425/87; 74/119; 604/157, 224; 220/315
See application file for complete search history.

(56) References Cited

U.S. PATENT DOCUMENTS

| | | | | |
|---|---|---|---|---|
| 949,545 | A | * | 2/1910 | Muller .......................... 222/390 |
| 1,397,510 | A | * | 11/1921 | Grassi ......................... 425/376.1 |
| 1,463,518 | A | * | 7/1923 | Thomas .......................... 431/91 |
| 1,576,821 | A | * | 3/1926 | Hamilton ........................ 222/95 |
| 2,058,960 | A | | 10/1936 | Diener |
| 2,243,774 | A | | 5/1941 | Resh |
| 2,416,470 | A | | 2/1947 | Cottingham |
| 2,417,140 | A | * | 3/1947 | Swanson ........................ 604/224 |
| 2,533,282 | A | | 12/1950 | Osman |

(Continued)

FOREIGN PATENT DOCUMENTS

| | | |
|---|---|---|
| DE | 1140525 B | 12/1962 |
| EP | 0 028 727 A1 | 5/1981 |

(Continued)

OTHER PUBLICATIONS

English Translation Abstract of Japanese Laid-Open Patent Publication No. 2005-095161; Separation Supply Container, Separation Supply Device and Separation Supply Method For Semisolid Food; Laid Open Apr. 14, 2005; 2 pages.

*Primary Examiner* — Kevin P Shaver
*Assistant Examiner* — Robert Nichols, II
(74) *Attorney, Agent, or Firm* — Fay Sharpe LLP

(57) ABSTRACT

A dispensing device having a housing capable of receiving a pre-packaged charge of pre-whipped topping or icing. The housing has an inner wall with a slot formed therein for receiving a rod. The rod engages with a pawl mechanism to move a piston in the axial direction to force the pre-whipped topping or icing through the outlet in its packaging. The pawl engages with the rod when it moves in a first direction and the pawl disengages with the rod when it is moved in a second direction opposite the first direction.

25 Claims, 5 Drawing Sheets

(56) References Cited

U.S. PATENT DOCUMENTS

| | | | |
|---|---|---|---|
| 2,541,949 A | 2/1951 | Thacker et al. | |
| 2,604,858 A | 7/1952 | Bosa | |
| 2,634,692 A * | 4/1953 | Sherbondy | 425/172 |
| 2,735,431 A * | 2/1956 | Swanson | 604/223 |
| 2,748,767 A * | 6/1956 | Wright | 604/209 |
| 3,110,310 A * | 11/1963 | Cislak | 604/209 |
| 3,833,154 A | 9/1974 | Markowitz | |
| 3,921,858 A | 11/1975 | Bemm | |
| 3,933,273 A * | 1/1976 | Cox | 222/1 |
| 4,090,639 A * | 5/1978 | Campbell et al. | 222/43 |
| 4,421,255 A * | 12/1983 | Czech | 222/387 |
| 4,432,473 A | 2/1984 | MacEwen | |
| 4,452,823 A | 6/1984 | Connolly et al. | |
| 4,506,810 A | 3/1985 | Goncalves | |
| 4,546,767 A * | 10/1985 | Smith | 606/93 |
| 4,643,337 A * | 2/1987 | Heck et al. | 222/214 |
| 4,646,999 A * | 3/1987 | Clark | 248/682 |
| 4,673,106 A * | 6/1987 | Fishman | 222/80 |
| 4,722,459 A * | 2/1988 | Goncalves | 222/135 |
| 4,749,106 A | 6/1988 | von Schuckmann et al. | |
| 4,763,815 A | 8/1988 | VonSchuckmann et al. | |
| 4,778,084 A | 10/1988 | Chen et al. | |
| 4,805,805 A | 2/1989 | Ocheskey | |
| 4,830,231 A | 5/1989 | Smith | |
| 4,846,371 A * | 7/1989 | Pfanstiel | 222/135 |
| 4,848,598 A * | 7/1989 | McKinney | 222/391 |
| 4,852,772 A | 8/1989 | Ennis, III | |
| 4,869,403 A | 9/1989 | Bruning | 222/327 |
| 4,869,915 A | 9/1989 | Inayoshi et al. | |
| 4,886,186 A | 12/1989 | Andris | |
| 4,892,427 A | 1/1990 | Ford | |
| 4,966,537 A * | 10/1990 | Bowles et al. | 425/87 |
| 4,998,645 A | 3/1991 | Pearson | |
| 5,088,623 A * | 2/1992 | Crawford | 222/40 |
| 5,154,327 A | 10/1992 | Long | |
| D335,069 S | 4/1993 | Capellan | |
| 5,356,037 A | 10/1994 | Harold | |
| 5,361,946 A | 11/1994 | Ginther et al. | |
| 5,363,990 A * | 11/1994 | Fillmore | 222/135 |
| 5,375,740 A * | 12/1994 | Umetsu et al. | 222/95 |
| 5,376,079 A * | 12/1994 | Holm | 604/191 |
| 5,425,590 A * | 6/1995 | Duty et al. | 401/176 |
| 5,429,273 A | 7/1995 | King et al. | |
| 5,634,572 A * | 6/1997 | Lane et al. | 222/95 |
| 5,955,114 A | 9/1999 | Llanos | |
| 5,993,188 A | 11/1999 | Mak | |
| 6,026,985 A | 2/2000 | Elliott, Sr. | |
| 6,153,238 A | 11/2000 | Shannon | |
| 6,158,621 A | 12/2000 | Keller | |
| 6,250,505 B1 | 6/2001 | Petit | |
| 6,267,999 B1 | 7/2001 | Romer et al. | |
| 6,268,000 B1 | 7/2001 | Romer | |
| 6,349,857 B1 * | 2/2002 | Lepsius et al. | 222/391 |
| 6,390,662 B1 | 5/2002 | Henry et al. | |
| 6,460,736 B1 | 10/2002 | D'Agostino | |
| 6,640,998 B1 * | 11/2003 | Kern | 222/87 |
| 6,824,018 B1 | 11/2004 | Eaddy et al. | |
| 6,871,557 B2 * | 3/2005 | Magnussen et al. | 73/864.01 |
| 6,926,177 B1 * | 8/2005 | Scott et al. | 222/390 |
| 6,981,621 B2 * | 1/2006 | Brandeis et al. | 222/392 |
| 7,011,238 B1 | 3/2006 | Sung | |
| 2003/0109834 A2 * | 6/2003 | Bitdinger et al. | 604/218 |
| 2005/0045660 A1 | 3/2005 | Ricks | |
| 2005/0128867 A1 * | 6/2005 | Henniges et al. | 366/139 |
| 2005/0139616 A1 * | 6/2005 | Ichikawa et al. | 222/325 |
| 2005/0247738 A1 | 11/2005 | Klein | |
| 2007/0023456 A1 | 2/2007 | Jalali et al. | |
| 2008/0006654 A1 * | 1/2008 | Lampe et al. | 222/80 |

FOREIGN PATENT DOCUMENTS

| | | |
|---|---|---|
| EP | 0 869 078 A2 | 10/1998 |
| FR | 850 458 | 12/1939 |
| FR | 1 519 772 | 5/1968 |
| FR | 2 501 080 | 9/1982 |
| JP | 11 319669 | 11/1999 |
| JP | H11-319669 | 11/1999 |
| JP | 200595161 A1 | 4/2005 |
| WO | WO 99/36333 | 7/1999 |

* cited by examiner

DISPENSING DEVICE FOR VISCOUS MATERIALS

CROSS-REFERENCE TO RELATED APPLICATIONS

This application is a continuation-in-part and claims benefit of U.S. patent application Ser. No. 11/388,592 entitled "Dispensing Device" filed on Mar. 24, 2006, which claims benefit of U.S. Provisional Patent Application No. 60/704,521 entitled "Dispensing Device" filed on Aug. 1, 2005

BACKGROUND OF THE INVENTION

The present invention may be used for dispensing viscous materials such as paste-like extrudable materials, extrudable foams, or the like. One area where the invention has particular application is the food industry. In the food industry, icing or pre-whipped toppings are typically applied manually by means of a cone shaped flexible package containing the substance to be dispensed. As an example, pre-whipped topping is typically supplied in a sealed bag having a conical shape with the product being dispensed from the narrower end where an outlet portion is formed. The outlet portion is typically opened by cutting with a pair of scissors. Other methods for opening the bag are also suitable. Once the flexible packaging is opened at the outlet, the product is dispensed by squeezing the sides of the packaging to force the product to exit through the opening. Manual dispensing of the pre-whipped topping or icing in this manner can cause muscle fatigue in the workers which can negatively impact productivity.

There is a need for a dispensing device that is easier to operate, that can be operated with one hand, that can be stored in a limited space, and that provides cooling properties for maintaining a safe temperature for the topping. In order to maintain the physical characteristics of the dispensed product, the dispenser should not provide any force to the pre-whipped topping or icing when the unit is not dispensing.

SUMMARY OF THE INVENTION

The present invention meets the above-described need by providing a dispensing device having a housing capable of receiving a pre-packaged charge of pre-whipped topping or icing. The housing has an inner wall with a slot formed therein for receiving a rod. The rod engages with a pawl mechanism to move a piston in the axial direction to force the pre-whipped topping or icing through the outlet in its packaging. The pawl engages with the rod when it moves in a first direction and the pawl disengages with the rod when it is moved in a second direction opposite the first direction.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figure 1:
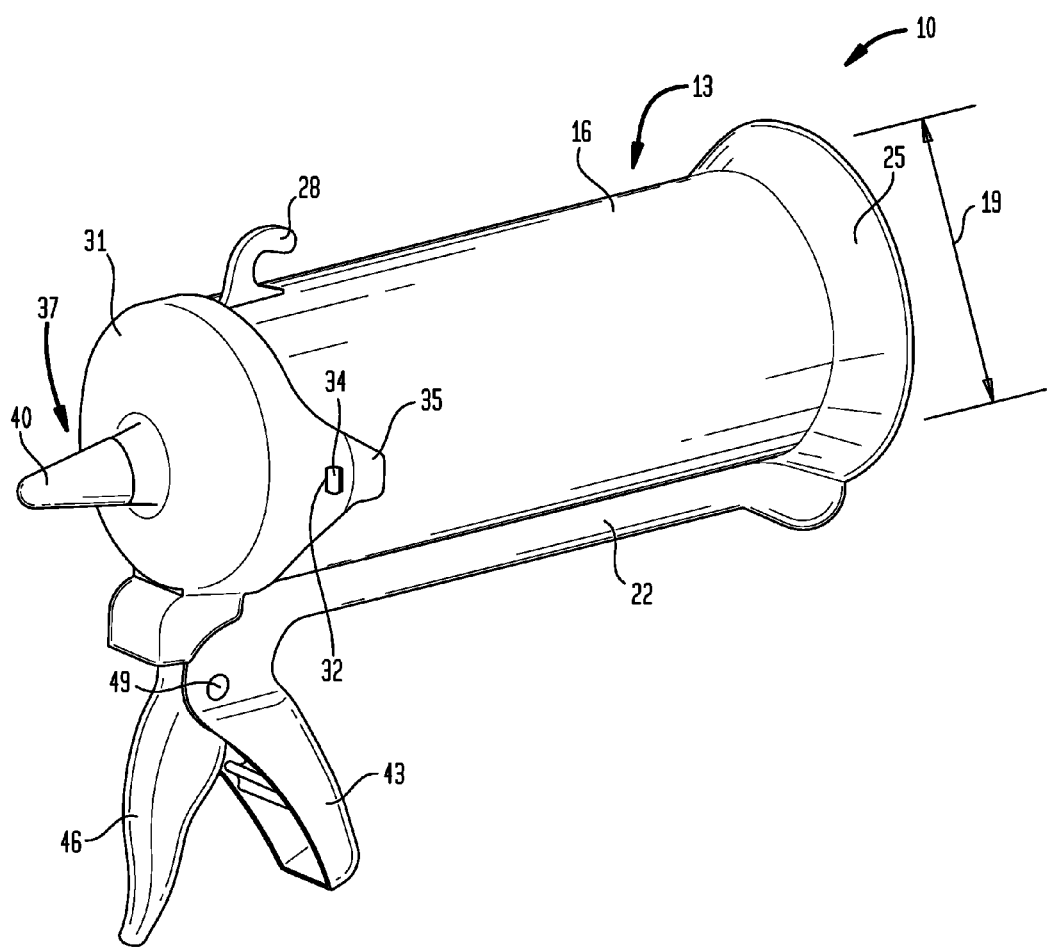
FIG. 1 is a perspective view of the dispensing device of the present invention.

Referring initially to FIG. 1, the dispensing device 10 of the present invention includes a body 13 having a first portion 16 with a round profile and a first diameter 19. The body 13 has a second portion 22 with a smaller diameter. The first portion 16 extends to a base portion 25 having a larger diameter. Although, the embodiment of the dispensing device 10 is described in connection with a round profile other shapes may be suitable as will be evident to those of ordinary skill in the art based on this disclosure. The body 13 may be provided with a hook 28 for hanging the device 10 when not in use.

The device 10 includes a cover 31 that may be removably attached to the front of the body 13. As shown the cover 31 may be provided with an opening 32 that frictionally engages with a protrusion 34 extending from the outside of the body 13. A tab 35 may be provided for removing the cover 31. The cover 31 has an outlet opening 37 at its center where a tip cover 40 is provided to cover the outlet opening 37 when the device 10 is not in use.

A handle 43 may be provided with a trigger 46 that is attached at pivot point 49. The trigger 46 is biased by a spring 52 (FIG. 2) in the open position. The trigger 46 operates a reciprocating rod that drives a piston as will be described in greater detail below.

Figure 2:
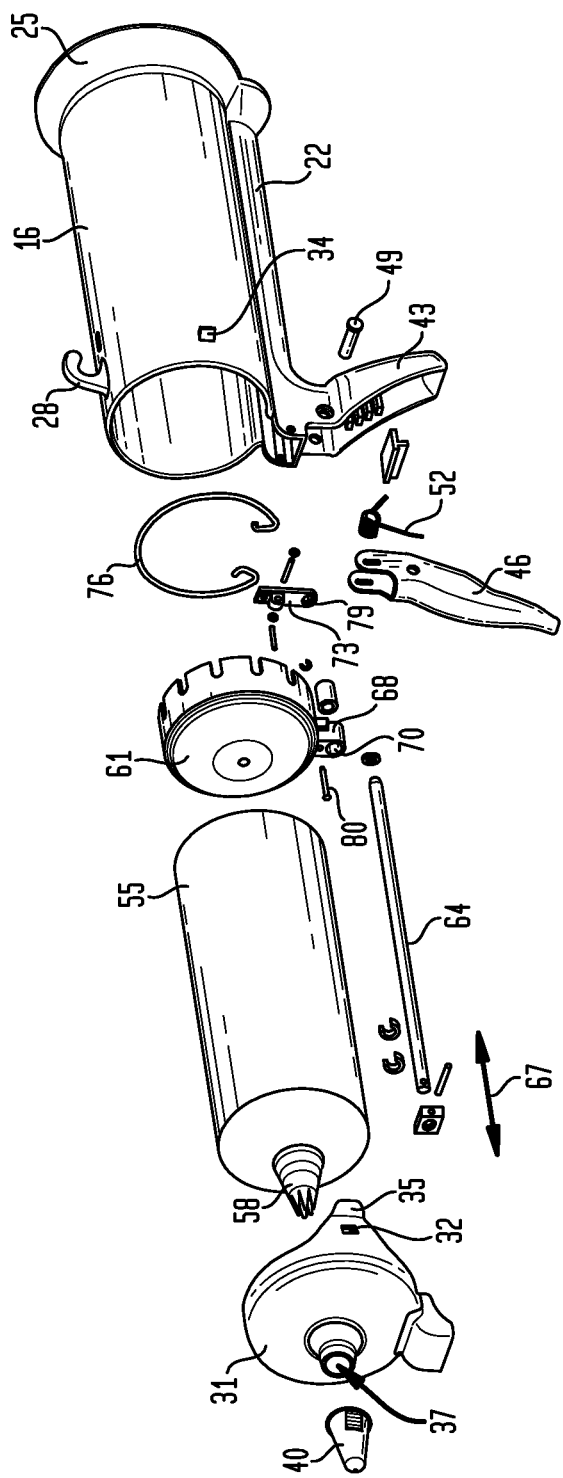
FIG. 2 is an exploded perspective view of the dispensing device of the present invention.

Turning to FIG. 2, the device 10 may receive a cylindrical shaped flexible package 55 with a built-in dispensing tip 58. The construction of the built-in dispensing tip 58 will be evident to those of ordinary skill in the art and therefore will not be discussed in detail herein. A piston 61 provides the force for causing a viscous material such as a pre-whipped topping to exit from the package 55. The piston 61 is mechanically coupled to a reciprocating rod 64. The rod 64 is moved back and forth in the axial direction indicated by arrow 67 by means of the spring biased trigger 46.

The rod 64 is coupled to the piston 61 by means of a pawl mechanism. The piston 61 has an extended portion 68 with an opening 70 that receives the rod 64 therethrough. A pawl 73 is biased by a spring 76 in an angled position relative to the piston 61 (best shown in FIG. 7). When the rod 64 moves from right to left with respect to the orientation of FIGS. 2 and 7, the frictional engagement between the rod 64 and the opening 79 in the pawl 73 causes the piston 61 to move forward in unison with the rod 64. The movement of the rod 64 caused by squeezing the trigger 46 causes the piston 61 to move from right to left with respect to the figure. This movement of the piston 61 compresses the flexible packaging 55 causing product to exit through the outlet opening 37. When the trigger 46 is released and the rod 64 moves in the opposite direction (from left to right with respect to the figure), the piston 61 moves from left to right slightly and decouples from the rod 64. As the rod 64 moves from left to right, the pawl 73 pivots away from the piston 61, and the rod 64 slides through the opening 79 in the pawl 73 into its spring-biased default position. The piston 61 remains roughly in the same position until the trigger 46 is squeezed again.

When the flexible packaging 55 is empty and the piston 61 needs to be moved from left to right in order to load another package of material, a reset rod 80 (best shown in FIG. 7) can be used. The reset rod 80 passes through the piston 61 and engages with the pawl 73 to cause it to pivot away from the piston 61 to allow the piston 61 to slide easily over the rod 64 back to its retracted position.

Figure 3:
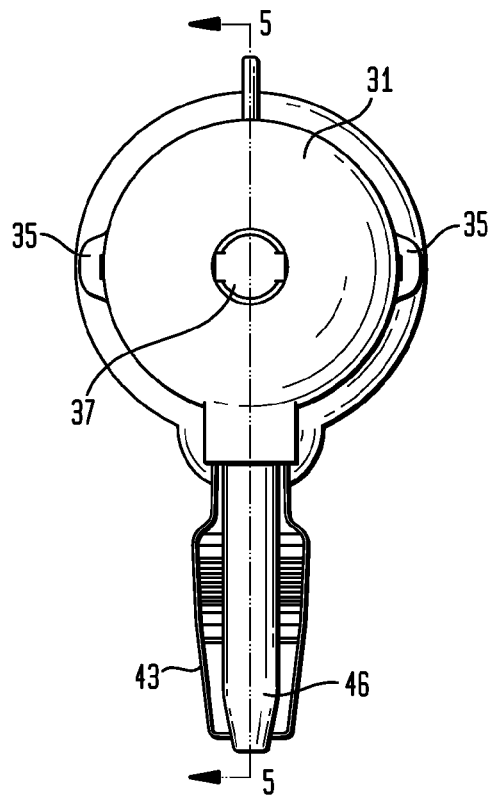
FIG. 3 is an end elevational view of the dispensing device.
Figure 4:
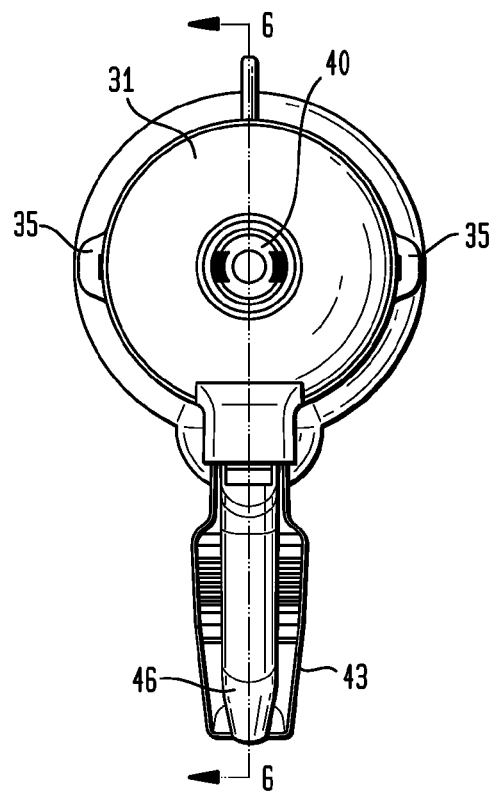
FIG. 4 is an end elevational view of the dispensing device.

Turning to FIGS. 3 and 4, an end view of the device 10 shows the handle 43 and trigger 46. The dispensing tip 58 is shown at the center of the figure and the tabs 35 for opening the cover 31 are also shown.

Figure 5:
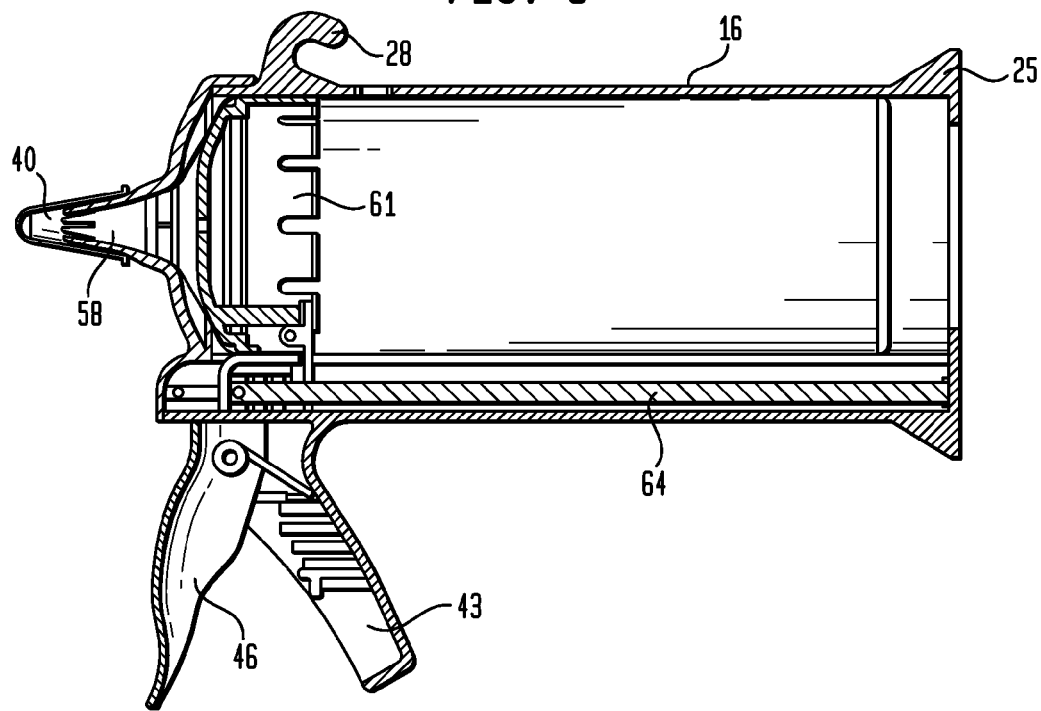
FIG. 5 is a cross-sectional view taken along lines 5-5 of FIG. 3.

FIG. 5 shows the dispensing device 10 with the piston 61 advanced to the end of its travel and the built in tip 58 of the packaging 55 seated in the outlet of the device 10. The trigger 46 has been released and the pawl 73 is in the position where the rod 64 can slide from left to right without moving the piston 61. After dispensing is completed, the cover 31 is removed and the pawl 73 is pivoted away from the piston 61 so that the piston 61 can be pushed back to the opposite end of the device 10 for loading a new package 55.

Figure 6:
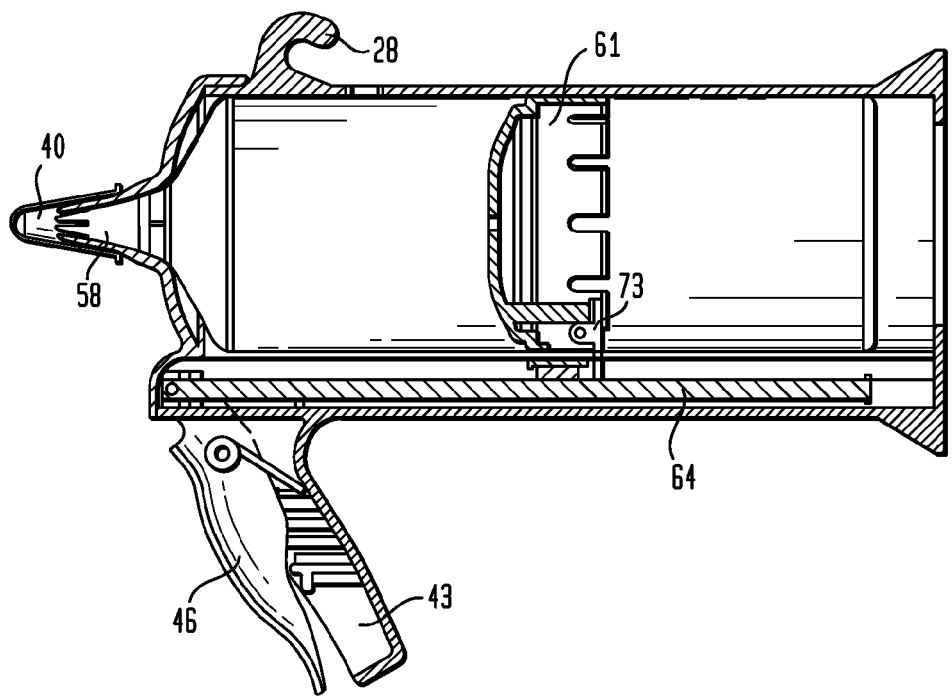
FIG. 6 is a cross-sectional view taken along lines 6-6 of FIG. 4.

FIG. 6 shows the dispensing device 10 in a half full condition with the trigger 46 depressed during dispensing.

Figure 7:
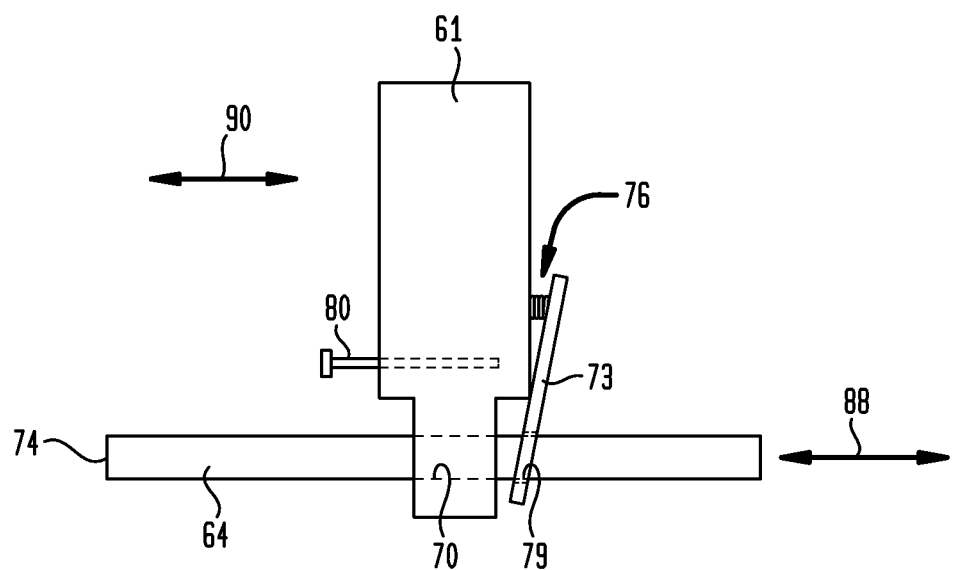
FIG. 7 is a schematic diagram showing the operation of the pawl mechanism of the present invention.

Turning to FIG. 7, a schematic diagram shows the piston 61 with the pawl 73 biased by spring 76 at an angle. When the rod 64 is moved from right to left in the direction of arrow 88, the frictional force of the rod 64 on the pawl 73 causes the piston 61 to move. When the rod 64 moves from left to right, the friction causes the pawl 73 to pivot away from the piston 61 to a position where the rod 64 can overcome the friction caused by engagement with the edge of the pawl 73 around opening 79. In this position, the rod 64 slides freely through the opening 79 in the pawl 73 and the rod 64 decouples from the piston 61.

In order to move the piston 61 from left to right to reload the dispensing device 10, a reset rod 80 may be used to press against the pawl 73 to cause it to pivot into the perpendicular position so that the piston 61 can slide along the rod 64 from left to right in the direction of arrow 90 with respect to the orientation of the figure.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A dispenser for dispensing a product, the dispenser comprising:
    a housing having a top portion, a bottom portion and a cavity located between said top and bottom portion, said cavity having an outlet in said top portion of said housing, at least a portion of said cavity designed to contain the product, said cavity having a first and a second portion, said first and second portions extend along at least a majority of a longitudinal length of said cavity, said second portion spaced from a central longitudinal axis of said cavity, said second portion having a side slot that opens into said first portion;
    a single piston disposed inside said housing and positioned at least partially in said cavity;
    a single spring-biased pawl mechanism at least partially contained within said cavity and connected to a side of said piston and having a pawl opening defined therein, said spring-biased pawl mechanism at least partially extending through said side opening in said second portion of said cavity;
    a single elongated rod offset from a central longitudinal axis of said cavity and positioned closely adjacent to an outer wall of said cavity and extending a majority of the longitudinal length of said cavity and is movable in a translatory motion along said longitudinal axis of said cavity in a first direction and in a second direction opposite said first direction, said elongated rod frictionally engaging with said pawl mechanism at said pawl opening such that when said elongated rod is moved in said first direction said pawl mechanism causes said piston to move in said first direction toward said top portion of said housing to thereby cause the product to be dispensed from said outlet, said pawl mechanism pivoting when said elongated rod is moved in said second direction such that said elongated rod passes through said pawl opening in said pawl mechanism and moves in said second direction independently of said piston to thereby inhibit or prevent movement of said piston by said elongated rod in said second direction; and,
    a trigger positioned at or adjacent to said top portion of said housing, said trigger in operative relation to said elongated rod such that actuation of said trigger to cause said trigger to move toward a closed position causes said elongated rod to move in said first direction and deactuation of said trigger causes said trigger to move to an open position to thereby cause said elongated rod to move in said second direction.

2. The dispenser as defined in claim 1, wherein said housing includes a hook positioned on an outer surface of said housing, said hook spaced from said trigger and positioned at or adjacent to said top portion of said housing.

3. A dispenser for dispensing a product, the dispenser comprising:
    a housing having a top portion, a bottom portion and a cavity located between said top and bottom portion, said cavity having an outlet in said top portion of said housing, at least a portion of said cavity designed to contain the product;
    a piston disposed inside said housing and positioned at least partially in said cavity;
    a spring-biased pawl mechanism at least partially contained within said cavity and connected to said piston and having a pawl opening defined therein;
    an elongated rod offset from a central longitudinal axis of said cavity and extending a majority of a longitudinal length of said cavity and is movable in a translatory motion along said longitudinal axis of said cavity in a first direction and in a second direction opposite said first direction, said elongated rod frictionally engaging with said pawl mechanism at said pawl opening such that when said elongated rod is moved in said first direction said pawl mechanism causes said piston to move in said first direction toward said top portion of said housing to thereby cause the product to be dispensed from said outlet, said pawl mechanism pivoting when said elongated rod is moved in said second direction such that said elongated rod passes through said pawl opening in said pawl mechanism and moves in said second direction independently of said piston to thereby inhibit or prevent movement of said piston by said elongated rod in said second direction;
    a trigger positioned at or adjacent to said top portion of said housing, said trigger in operative relation to said elongated rod such that actuation of said trigger to cause said trigger to move toward a closed position causes said elongated rod to move in said first direction and deactuation of said trigger causes said trigger to move to an open position to thereby cause said elongated rod to move in said second direction; and,
    a cover, said cover including a cover opening, a cross-sectional area of said cover opening less than a cross-sectional area of said opening in said top portion of said housing, said cover movable between an attached and at least partially detached position, said at least partially detached position designed to enable the product to be inserted into said cavity of said housing, said attached position designed to restrict the product from being removed from said cavity.

4. The dispenser as defined in claim 3, wherein the product includes a flexible package containing a viscous material in the flexible package and a dispensing tip positioned at one end of the flexible package, the dispensing tip designed to be at least partially inserted into said cover opening of said cover when the product is positioned in said cavity and said cover is in said attached position.

5. The dispenser as defined in claim 4, wherein said housing includes a protrusion on said outer surface of said housing, said protrusion designed to at least partially secure said cover to said housing when said cover is in said attached position.

6. The dispenser as defined in claim 5, wherein said housing includes a handle positioned at or adjacent to said top portion, said trigger portion pivotally connected to said handle, said trigger biased by a spring in said open position.

7. The dispenser as defined in claim 6, wherein said housing includes a hook positioned on an outer surface of said housing, said hook spaced from said trigger and positioned at or adjacent to said top portion of said housing.

8. The dispenser as defined in claim 7, wherein said housing has a first portion and a second portion, said second portion positioned adjacent to said first portion, said second portion having a smaller cross-sectional area than said first portion, said second portion designed to receive said elongated rod and said first portion designed to receive said product when positioned in said cavity.

9. The dispenser as defined in claim 8, further including a cap that is releasably connected to said cover opening, said cap joined to said cover by a friction fit.

10. The dispenser as defined in claim 3, wherein said housing includes a protrusion on said outer surface of said housing, said protrusion designed to at least partially secure said cover to said housing when said cover is in said attached position.

11. The dispenser as defined in claim 3, further including a cap that is releasably connected to said cover opening, said cap joined to said cover by a friction fit.

12. A dispenser for dispensing a product, the dispenser comprising:
a housing having a top portion, a bottom portion, a cavity located between said top and bottom portion and a handle positioned at or adjacent to said top portion, said cavity having an outlet in said top portion of said housing, at least a portion of said cavity designed to contain the product;
a piston disposed inside said housing and positioned at least partially in said cavity;
a spring-biased pawl mechanism at least partially contained within said cavity and connected to said piston and having a pawl opening defined therein;
an elongated rod offset from a central longitudinal axis of said cavity and extending a majority of a longitudinal length of said cavity and is movable in a translatory motion along said longitudinal axis of said cavity in a first direction and in a second direction opposite said first direction, said elongated rod frictionally engaging with said pawl mechanism at said pawl opening such that when said elongated rod is moved in said first direction said pawl mechanism causes said piston to move in said first direction toward said top portion of said housing to thereby cause the product to be dispensed from said outlet, said pawl mechanism pivoting when said elongated rod is moved in said second direction such that said elongated rod passes through said pawl opening in said pawl mechanism and moves in said second direction independently of said piston to thereby inhibit or prevent movement of said piston by said elongated rod in said second direction; and,
a trigger positioned at or adjacent to said top portion of said housing, said trigger in operative relation to said elongated rod such that actuation of said trigger to cause said trigger to move toward a closed position causes said elongated rod to move in said first direction and deactuation of said trigger causes said trigger to move to an open position to thereby cause said elongated rod to move in said second direction, said trigger pivotally connected to said handle, said trigger biased by a spring in said open position.

13. A dispenser for dispensing a product, the dispenser comprising:
a housing having a top portion, a bottom portion and a cavity located between said top and bottom portion, said cavity having an outlet in said top portion of said housing, at least a portion of said cavity designed to contain the product, said cavity having a first and a second portion, said first and second portions extend along at least a majority of a longitudinal length of said cavity, said second portion spaced from a central longitudinal axis of said cavity, said second portion having a side slot that opens into said first portion, said second portion having a smaller cross-sectional area than said first portion, said second portion designed to receive an elongated rod and said first portion designed to receive said product when positioned in said cavity, said first and second portion extending a majority of a longitudinal length of said housing;
a piston disposed inside said housing, a majority of said piston is located in said first portion of said cavity;
a spring-biased pawl mechanism at least partially contained within said cavity and connected to said piston and having a pawl opening defined therein, said pawl at least partially positioned in and movable in said second portion of said cavity, said spring-biased pawl mechanism at least partially extending through said side opening in said second portion of said cavity;
an elongated rod at least partially positioned in said second portion of said cavity and extending a majority of the longitudinal length of said cavity and is movable in a translatory motion along said longitudinal axis of said cavity in a first direction and in a second direction opposite said first direction, said elongated rod frictionally engaging with said pawl mechanism at said pawl opening such that when said elongated rod is moved in said first direction said pawl mechanism causes said piston to move in said first direction toward said top portion of said housing to thereby cause the product to be dispensed from said outlet, said pawl mechanism pivoting when said elongated rod is moved in said second direction such that said elongated rod passes through said pawl opening in said pawl mechanism and moves in said second direction independently of said piston to thereby inhibit or prevent movement of said piston by said elongated rod in said second direction; and,
a trigger positioned at or adjacent to said top portion of said housing, said trigger in operative relation to said elongated rod such that actuation of said trigger to cause said trigger to move toward a closed position causes said elongated rod to move in said first direction and deactuation of said trigger causes said trigger to move to an open position to thereby cause said elongated rod to move in said second direction.

14. A dispenser for dispensing a viscous material contained in a flexible package, the dispenser comprising:
a housing having a top portion, a bottom portion, a first cavity and a second cavity, said second cavity positioned adjacent to said first cavity, said second cavity having a smaller cross-sectional area than said first cavity, said first cavity and said second cavity located between said top and bottom portion, said first cavity having an outlet in said top portion of said housing, said first cavity designed to contain a majority of the flexible package, said first and second cavity extending a majority of a longitudinal length of said housing, said first and second cavity extend along at least a majority of a longitudinal length of said housing, said second cavity spaced from a central longitudinal axis of said first cavity, said second cavity having a side slot that opens into said first cavity;
a piston disposed inside said housing, a majority of said piston is positioned in said first cavity;
a spring-biased pawl mechanism connected to said piston and having a pawl opening defined therein, said pawl movable in said second cavity, said spring-biased pawl mechanism at least partially extending through said side opening in said second cavity and into said first cavity;
an elongated rod at least partially positioned in said second cavity, said elongated rod extending a majority of a longitudinal length of said second cavity and is movable in a translatory motion along said longitudinal axis of said second cavity in a first direction and in a second direction opposite said first direction, said elongated rod frictionally engaging with said pawl mechanism at said pawl opening such that when said elongated rod is moved in said first direction said pawl mechanism causes said piston to move in said first direction toward said top portion of said housing to thereby cause the flexible package to be dispensed from said outlet, said pawl mechanism pivoting when said elongated rod is moved in said second direction such that said elongated rod passes through said pawl opening in said pawl mechanism and moves in said second direction independently of said piston thereby inhibiting or preventing movement of said piston by said elongated rod in said second direction; and,
a trigger moveable between an open and closed position, said trigger in operative relation to said elongated rod such that actuation of said trigger causing said trigger to move toward said closed position causes said elongated rod to move in said first direction and deactuation of said trigger causes said trigger to move to said open position to thereby cause said elongated rod to move in said second direction.

15. The dispenser as defined in claim 14, wherein said elongated rod is fully contained in said second cavity and said first cavity is designed to fully contain the flexible package when placed in said first cavity.

16. The dispenser as defined in claim 14, wherein said housing includes a hook positioned on an outer surface of said housing, said hook spaced from said trigger and positioned at or adjacent to said top portion of said housing.

17. A dispenser for dispensing a viscous material contained in a flexible package, the dispenser comprising:
a housing having a top portion, a bottom portion, a first cavity and a second cavity, said second cavity positioned adjacent to said first cavity, said second cavity having a smaller cross-sectional area than said first cavity, said first cavity located between said top and bottom portion, said first cavity having an outlet in said top portion of said housing, said first cavity designed to contain a majority of the flexible package, said first and second cavity extend along at least a majority of a longitudinal length of said housing, said second cavity spaced from a central longitudinal axis of said first cavity, said second cavity having a side slot that opens into said first cavity;
a piston disposed inside said housing and positioned at least partially in said first cavity;
a spring-biased pawl mechanism connected to said piston and having a pawl opening defined therein, said spring-biased pawl mechanism at least partially extending through said side opening in said second cavity and into said first cavity;
an elongated rod at least partially positioned in said second cavity, said elongated rod extending a majority of a longitudinal length of said second cavity and is movable in a translatory motion along said longitudinal axis of said second cavity in a first direction and in a second direction opposite said first direction, said elongated rod frictionally engaging with said pawl mechanism at said pawl opening such that when said elongated rod is moved in said first direction said pawl mechanism causes said piston to move in said first direction toward said top portion of said housing to thereby cause the flexible package to be dispensed from said outlet, said pawl mechanism pivoting when said elongated rod is moved in said second direction such that said elongated rod passes through said pawl opening in said pawl mechanism and moves in said second direction independently of said piston thereby inhibiting or preventing movement of said piston by said elongated rod in said second direction;
a trigger moveable between an open and closed position, said trigger in operative relation to said elongated rod such that actuation of said trigger causing said trigger to move toward said closed position causes said elongated rod to move in said first direction and deactuation of said trigger causes said trigger to move to said open position to thereby cause said elongated rod to move in said second direction; and,
a cover, said cover including a cover opening, a cross-sectional area of said cover opening less than a cross-sectional area of an opening in said top portion of said housing, said cover movable between an attached and at least partially detached position, said at least partially detached position designed to enable the flexible package to be inserted into said first cavity of said housing, said attached position designed to restrict the flexible package from being removed from said first cavity.

18. The dispenser as defined in claim 17, wherein the flexible package includes a dispensing tip positioned at one end of the flexible package, the dispensing tip is designed to be at least partially inserted into said cover opening of said cover when the flexible package is positioned in said first cavity and said cover is in said attached position.

19. The dispenser as defined in claim 18, wherein said housing includes a protrusion on said outer surface of said housing, said protrusion designed to at least partially secure said cover to said housing when said cover is in said attached position.

20. The dispenser as defined in claim 17, wherein said housing includes a protrusion on said outer surface of said housing, said protrusion designed to at least partially secure said cover to said housing when said cover is in said attached position.

21. A dispenser for dispensing a viscous material contained in a flexible package, the dispenser comprising:
- a housing having a top portion, a bottom portion, a first cavity and a second cavity, said second cavity positioned adjacent to said first cavity said second cavity having a smaller cross-sectional area than said first cavity, said first cavity and said second cavity located between said top and bottom portion, said first cavity having an outlet in said top portion of said housing, said first cavity designed to contain a majority of the flexible package, said first and second cavity extending a majority of a longitudinal length of said housing, said second cavity spaced from a central longitudinal axis of said first cavity, said second cavity having a side slot that opens into said first cavity;
- a piston disposed inside said housing, a majority of said piston is positioned in said first cavity;
- a spring-biased pawl mechanism connected to said piston and having a pawl opening defined therein, said pawl movable in said second cavity, said spring-biased pawl mechanism at least partially extending through said side opening in said second cavity and into said first cavity;
- an elongated rod at least partially positioned in said second cavity, said elongated rod extending a majority of a longitudinal length of said second cavity and is movable in a translatory motion along said longitudinal axis of said second cavity in a first direction and in a second direction opposite said first direction, said elongated rod frictionally engaging with said pawl mechanism at said pawl opening such that when said elongated rod is moved in said first direction said pawl mechanism causes said piston to move in said first direction toward said top portion of said housing to thereby cause the flexible package to be dispensed from said outlet, said pawl mechanism pivoting when said elongated rod is moved in said second direction such that said elongated rod passes through said pawl opening in said pawl mechanism and moves in said second direction independently of said piston thereby inhibiting or preventing movement of said piston by said elongated rod in said second direction;
- a trigger moveable between an open and closed position, said trigger in operative relation to said elongated rod such that actuation of said trigger causing said trigger to move toward said closed position causes said elongated rod to move in said first direction and deactuation of said trigger causes said trigger to move to said open position to thereby cause said elongated rod to move in said second direction; and,
- a cover, said cover including a cover opening, a cross-sectional area of said cover opening less than a cross-sectional area of said opening in said top portion of said housing, said cover movable between an attached and at least partially detached position, said at least partially detached position designed to enable the flexible package to be inserted into said first cavity of said housing, said attached position designed to restrict the flexible package from being removed from said first cavity.

22. The dispenser as defined in claim 21, wherein the flexible package includes a dispensing tip positioned at one end of the flexible package, the dispensing tip is designed to be at least partially inserted into said cover opening of said cover when the flexible package is positioned in said first cavity and said cover is in said attached position.

23. A dispenser for dispensing a viscous material contained in a flexible package, the dispenser comprising:
- a housing having a top portion, a bottom portion, a first cavity and a second cavity, said second cavity positioned adjacent to said first cavity, said second cavity having a smaller cross-sectional area than said first cavity, said first cavity and said second cavity located between said top and bottom portion, said first cavity having an outlet in said top portion of said housing, said first cavity designed to contain a majority of the flexible package, said first and second cavity extending a majority of a longitudinal length of said housing, said housing includes a handle positioned at or adjacent to said top portion, a trigger pivotally connected to said handle, said trigger biased by a spring in said open position;
- a piston disposed inside said housing, a majority of said piston is positioned in said first cavity;
- a spring-biased pawl mechanism connected to said piston and having a pawl opening defined therein, said pawl movable in said second cavity;
- an elongated rod at least partially positioned in said second cavity, said elongated rod extending a majority of a longitudinal length of said second cavity and is movable in a translatory motion along said longitudinal axis of said second cavity in a first direction and in a second direction opposite said first direction, said elongated rod frictionally engaging with said pawl mechanism at said pawl opening such that when said elongated rod is moved in said first direction said pawl mechanism causes said piston to move in said first direction toward said top portion of said housing to thereby cause the flexible package to be dispensed from said outlet, said pawl mechanism pivoting when said elongated rod is moved in said second direction such that said elongated rod passes through in said pawl mechanism and moves in said second direction independently of said piston thereby inhibiting or preventing movement of said piston by said elongated rod in said second direction; and,
- said trigger moveable between an open and closed position, said trigger in operative relation to said elongated rod such that actuation of said trigger causing said trigger to move toward said closed position causes said elongated rod to move in said first direction and deactuation of said trigger causes said trigger to move to said open position to thereby cause said elongated rod to move in said second direction.

24. A dispenser for dispensing a viscous material contained in a flexible package, the dispenser comprising:
- a housing having a top portion, a bottom portion, a first cavity and a second cavity, said second cavity positioned adjacent to said first cavity, said second cavity having a smaller cross-sectional area than said first cavity, said first cavity located between said top and bottom portion, said first cavity having an outlet in said top portion of said housing, said first cavity designed to contain a majority of the flexible package, said housing includes a handle positioned at or adjacent to said top portion, a trigger portion pivotally connected to said handle, said trigger biased by a spring in said open position;
- a piston disposed inside said housing and positioned at least partially in said first cavity;
- a spring-biased pawl mechanism connected to said piston and having a pawl opening defined therein:
- an elongated rod at least partially positioned in said second cavity, said elongated rod extending a majority of a longitudinal length of said second cavity and is movable in a translatory motion along said longitudinal axis of said second cavity in a first direction and in a second direction opposite said first direction, said elongated rod frictionally engaging with said pawl mechanism at said pawl opening such that when said elongated rod is moved in said first direction said pawl mechanism causes said piston to move in said first direction toward said top portion of said housing to thereby cause the flexible package to be dispensed from said outlet, said pawl mechanism pivoting when said elongated rod is moved in said second direction such that said elongated rod passes through said pawl opening in said pawl mechanism and moves in said second direction independently of said piston thereby inhibiting or preventing movement of said piston by said elongated rod in said second direction;

said trigger moveable between an open and closed position, said trigger in operative relation to said elongated rod such that actuation of said trigger causing said trigger to move toward said closed position causes said elongated rod to move in said first direction and deactuation of said trigger causes said trigger to move to said open position to thereby cause said elongated rod to move in said second direction; and, a cover, said cover including a cover opening, a cross-sectional area of said cover opening less than a cross-sectional area of an opening in said top portion of said housing, said cover movable between an attached and at least partially detached position, said at least partially detached position designed to enable the flexible package to be inserted into said first cavity of said housing, said attached position designed to restrict the flexible package from being removed from said first cavity.

25. The dispenser as defined in claim 24, wherein said housing includes a hook positioned on an outer surface of said housing, said hook spaced from said trigger and positioned at or adjacent to said top portion of said housing.

* * * * *